United States Patent [19]

Kawabata et al.

[11] Patent Number: 4,796,683

[45] Date of Patent: Jan. 10, 1989

[54] PNEUMATIC RADIAL TIRE

[75] Inventors: Misao Kawabata, Saitama; Tetsuro Kobayashi, Fussa, both of Japan

[73] Assignee: Bridgestone Corporation, Tokyo, Japan

[21] Appl. No.: 4,944

[22] Filed: Jan. 20, 1987

[30] Foreign Application Priority Data

Apr. 30, 1986 [JP] Japan ................... 61-99553

[51] Int. Cl.$^4$ .............. B60C 11/04; B60C 11/11
[52] U.S. Cl. .................... 152/209 R; 152/209 D
[58] Field of Search ........... 152/209 R, 209 D, 209 B

[56] References Cited

U.S. PATENT DOCUMENTS 4,122,879 10/1978 Takigawa et al. .............. 152/209 R
4,690,189 9/1987 Bradisse ......................... 152/209 R

FOREIGN PATENT DOCUMENTS 2912546 10/1980 Fed. Rep. of Germany ... 152/209 D
0197409 10/1985 Japan ............................. 152/209 D Primary Examiner—Michael W. Ball
Assistant Examiner—Ramon R. Hoch
Attorney, Agent, or Firm—Sughrue, Mion, Zinn, Macpeak & Seas

[57] ABSTRACT

To prevent tire unbalanced abrasion, that is, tire unbalanced rigidity between the acute angle corners and the obtuse angle corners of blocks forming a tire tread pattern, without decreasing the tire drainage and increasing tire pattern noise, block side walls extending along the main circumferential grooves are sloped down to the bottom of the main grooves in such a way that an inclination angle between the tread surface normal line and the block side wall increases gradually from the obtuse angle corners of the blocks to the acute angle corners thereof. Preferably, the inclination angle is 8 degrees at the obtuse angle corner and 25 degrees at the acute angle corner on the wide main circumferential groove, and 7 degrees at the obtuse angle corner and 13 degrees at the acute angle corner on the main circumferential grooves adjacent to the wide main groove.

9 Claims, 2 Drawing Sheets

TREAD END — TREAD END

ACUTE ANGLE CORNER

OBTUSE ANGLE CORNER

PNEUMATIC RADIAL TIRE

BACKGROUND OF THE INVENTION

1. Field of the Invention

The present invention relates to a pneumatic radial tire, and more specifically to a pneumatic radial tire in which unbalanced abrasion at blocks forming a tire tread pattern can be improved without increasing tread pattern noise and decreasing tread pattern drainage.

2. Description of the Prior Art

FIG. 1 shows an example of block pattern of a radial tire. This tire block pattern is formed of a plurality of substantially quadrate or polygonal blocks 30 arranged on a tread surface T of the tire. The block pattern is formed or partitioned by a plurality of the main circumferential grooves 10 extending in the circumferential direction of the tire substantially in parallel to each other and a plurality of transversal grooves intersecting the main circumferential grooves 10 at an inclination angle.

In the block pattern of this kind, there exists a tendency such that the transversal grooves 20 are greatly inclined with respect to the circumferential direction of the tire in order to increase the drainage and decrease the pattern noise.

Therefore, in each block 30 formed by intersections of the main circumferential grooves 10 and the transversal grooves 20, there inevitably exist acute angle corners 30a and obtuse angle corners 30b. As a result, there exists a problem in that abrasion increases near the obtuse angle corners 30b, because the rigidity is lowered near the acute angle corners 30a and therefore load should mainly be supported near the obtuse angle corners 30b.

In a high-performance radial tire having a block pattern of this kind, since the tire is often used under severe conditions such as steep start, steep stop, steep turn, etc. as compared with the ordinary tires, blocks 30, arranged near a relatively-wide main circumferential grooves $10_1$ located on both the side areas $T_S$ of the tread surface T are in particular subjected to a great deformation. As a result, the rigidity is markedly lowered in the areas M near the acute angle corners 30a and therefore the areas N near the obtuse angle corners 30b are subjected to heavy load as compared with the areas M near the acute angle corners 30a, so that unbalanced abrasion develops between the areas N and the areas M, and a large abrasion increases at the areas N near the obtuse angle corners 30b.

SUMMARY OF THE INVENTION

With these problems in mind, therefore, it is the primary object of the present invention to provide a pneumatic radial tire which can securely prevent the occurrence of unbalanced abrasion on the tread surface of the radial tire without decreasing drainage and increasing pattern noise.

To achieve the above-mentioned object, in a pneumatic radial tire having blocks arranged on a tread surface thereof and partitioned by a plurality of main circumferential grooves extending in a circumferential direction of the tire substantially in parallel to each other and a plurality of transversal grooves intersecting the main circumferential grooves being inclined at an angle, the pneumatic radial tire according to the present invention is characterized in that block side walls extending along at least one side line of the main circumferential grooves are sloped down to a bottom of the main circumferential groove in such a way that an angle between a normal line on the tread surface and the block side wall increases gradually from an obtuse angle corner of the block to an acute angle corner thereof. The difference in the inclination angle between the obtuse angle corner and the acute angle corner of the block is preferably 5 degrees or more.

In particular, the block side walls are sloped down to a first relatively wide main circumferential groove formed near a tire equator line and a second main circumferential groove formed adjacent to the first main groove.

Preferably, the inclination angle is 8 degrees at the obtuse angle corner and 25 degrees at the acute angle corner on the first wide main circumferential groove, and 7 degrees at the obtuse angle corner and 13 degrees at the acute angle corner on the second main circumferential groove.

In the radial tire according to the present invention, since the acute angle corners of the blocks are sloped down at a large inclination angle as compared with the obtuse angle corners of the blocks, it is possible to increase the rigidity in the acute angle corners so that the rigidity can be well balanced over the block surface. Therefore, it is possible to prevent unbalanced abrasion on the block surface without exerting harmful influence upon the drainage and the pattern noise.

DETAILED DESCRIPTION OF THE PREFERRED EMBODIMENT

An embodiment of the present invention will be described hereinbelow with reference to the attached drawings.

Figure 1:
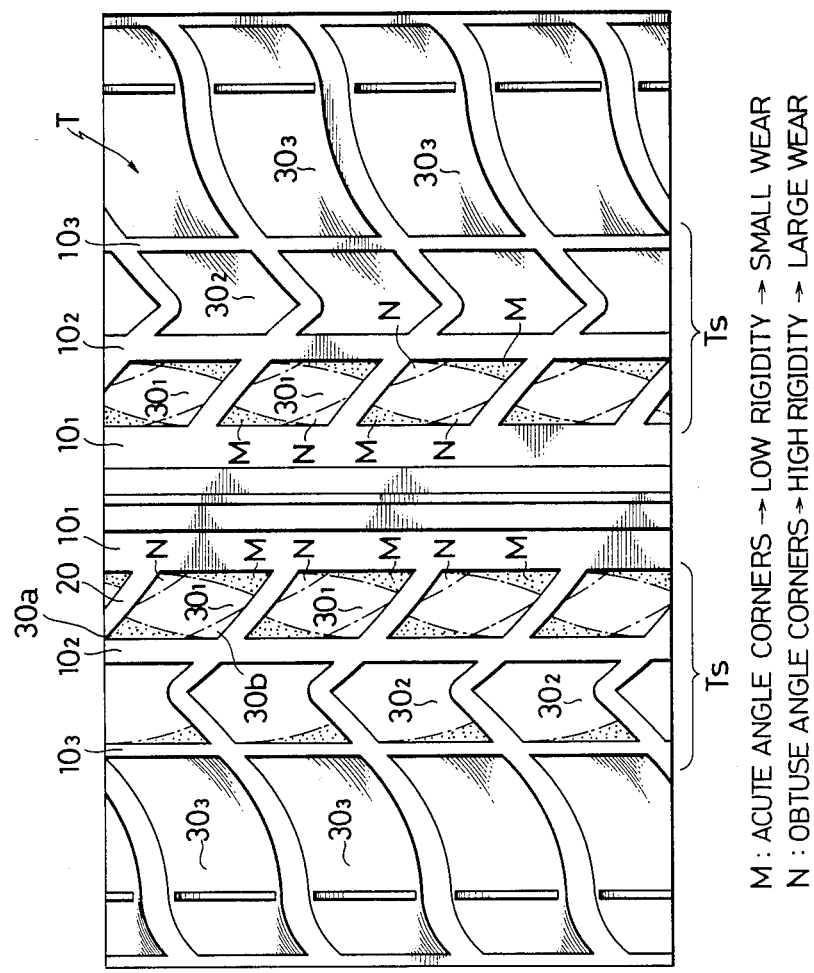
FIG. 1 is a partial plan development view of a prior-art radial tire, in which deformations caused by load are shown by dotted areas.
Figure 2:
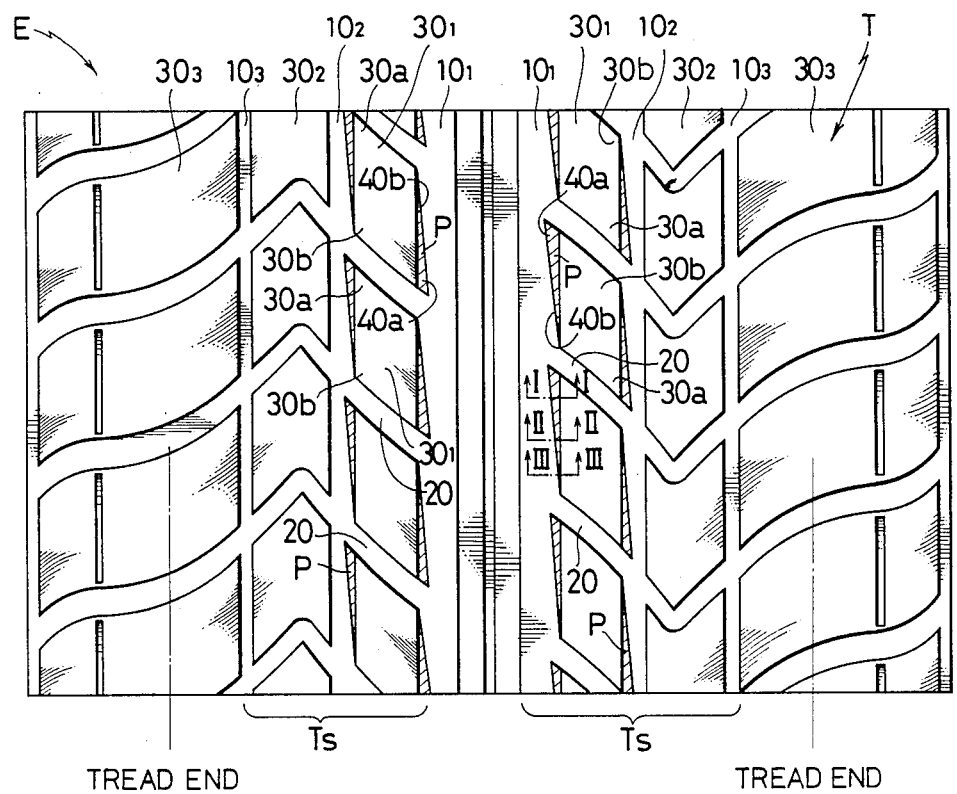
FIG. 2 in a partial plan development view showing the essential portions of the pneumatic radial tire according to the present invention, in which slopes seen from above are shown by shaded areas.

In FIG. 2, a pneumatic radial tire according to the present invention is formed with a plurality of diamond-shaped blocks 30 indicative of a tire tread pattern arranged on a tread surface T of the tire, similarly to that shown in FIG. 1. These blocks 30 are formed or partitioned by plurality of the main circumferential grooves 10 extending in the circumferential direction of the tire and arranged substantially in parallel to each other. A plurality of transversal grooves 20 intersects the main circumferential grooves 10 being inclined at an inclination angle with respect to the main circumferential grooves 10. Here, the numeral $10_1$, denotes first relatively wide main circumferential grooves on the tire equatorial surface side; the numeral $10_2$ denotes second main circumferential grooves adjacent to the first main grooves $10_1$, and so on. Being different from the prior art pattern blocks, in the present invention, block side walls 40 extending along at least one side line of the main circumferential groove 10 are sloped down to the bottom of the groove 10 in such a way that an angle between a normal line on the tread surface and the block side wall increases gradually from an obtuse angle corner of the block to an acute angle corner thereof.

Figure 3A:
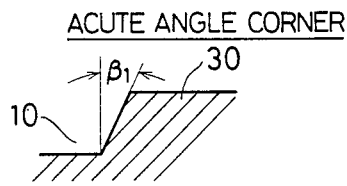
FIG. 3(a) is an enlarged cross-sectional view taken along the line I—I in FIG. 2.
Figure 3B:
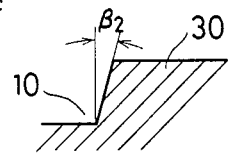
FIG. 3(b) is an enlarged cross-sectional views taken along the ling II—II in FIG. 2.
Figure 3C:
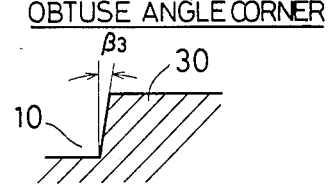
FIG. 3(c) is an enlarged cross-sectional view taken along the line III—III in FIG. 2.

In more detail with reference to FIG. 2, the block side H walls 40a at the acute angle corners 30a of the blocks $30_1$ sandwiched between the relatively wide main circumferential groove $10_1$ on the equatorial surface side and the main circumferential groove $10_2$ is sloped down at an inclination angle $\beta_1$ as shown in FIG. 3(a), while the same block side walls 40a at the obtuse angle corners 30b is sloped down at an inclination angle $\beta_3$ smaller than $\beta_1$ as shown in FIG. 3(c). Further, the inclination angle $\beta$ of the block side walls increases gradually from $\beta_3$ (at the obtuse angle corner) to $\beta_1$ (at the acute angle corner).

Since each block 30 is greatly beveled (zone P) at the acute angle corners, the rigidity at the acute angle corners can be increased as compared when the block 30 is not beveled. Therefore, in case a force is applied to the tire in the lateral direction thereof due to a steep turn, for instance, it is possible to reduce an unbalance in block rigidity between the acute angle corners 30a and the obtuse angle corners 30b. Therefore it is possible to reduce an unbalance in load supportability therebetween, so that unbalanced abrasion at blocks forming a tire tread pattern can be improved. As illustrated in FIG. 2, the beveling is such that the block sidewalls extending along the circumferential grooves $10_1$ and $10_2$ slope outwardly down to the bottom of the groove. The groove width at the top is constant since the sidewall edge is parallel to the circumferential direction. At the bottom, the bevel decreases the groove width inversely proportional to the inclination angle $\beta$.

It is preferable that a difference in inclination angle $\beta$ (between the wall slope and a normal line vertical to the tread curved surface as depicted in FIG. 3) is 5 degrees or more between the acute angle corners 30a and the obtuse angle corners 30b although being dependent upon the top view of the block 30, but decreases gradually from the acute angle corners 30a to the obtuse angle corners 30b. This is because when the difference in the inclination angle $\beta$ is less than 5 degrees, it is impossible to sufficiently eliminate the unbalance in the block rigidity between the acute angle corners 30a and the obtuse angle corners 30b, so that a desired effect is not obtainable.

Further, it is also possible to change the inclination angle $\beta$ from the obtuse angle corner to the acute angle corner on the side wall of the block in steps.

In order to securely prevent the occurrence of unbalanced abrasion without degrading the tire drainage and the pattern noise, it is preferable that the difference in the inclination angle $\beta$ of the block side walls 40 between the acute angle corners 30a the obtuse angle corners 30b on the first wide main circumferential groove side $10_1$ is determined greater than that on the second main circumferential groove side $10_2$ adjacent to the first grooves $10_1$. This is because when only the side walls of blocks $30_2$ and $30_3$ formed between two relatively narrow main circumferential grooves are sloped down, the effect is not prominent. That is, the difference in the block rigidity between the acute angle corners 30a and the obtuse angle corners 30b is small with respect to the blocks separated between two relatively-narrow main circumferential grooves $10_2$ and $10_3$, being different from the wide main circumferential grooves $10_1$. However, it is of course possible to slope the side walls down throughout the tread surface in accordance with the present invention.

Further, when a plurality of blocks of different shapes such that a difference in angle between the acute angle corner and the obtuse angle corner is different from each other, when seen from above, are included on the same tread surface, it is preferable to increase the difference ($\beta_1-\beta_3$) in the inclination angle between the acute angle corner $\beta_1$ and the obtuse angle corner $\beta_3$ in proportion to the difference in angle between the acute angle corner and the obtuse angle corner obtained when seen from above in FIG. 2.

In the present embodiment, nothing is described of the slopes formed at the block side walls facing the transversal grooves. However, it is also possible to form the similar slopes on the block side walls along the transversal grooves.

In the embodiment shown in FIG. 2, the width is 10 mm in the main circumferential groove $10_1$, 6 mm in the main groove $10_2$, and 2 mm in the main groove $10_3$. Further, in the block $30_1$ formed between the main grooves $10_1$ and $10_2$ and between two transversal grooves 20, the inclination angle $\beta_1$ at the acute angle corners 30a of the block side wall 40a formed along the main groove $10_1$ is 25 degrees at its maximum; while that $\beta_1$ at the acute angle corners 30a of the block side wall 40a formed along the main groove $10_2$ is 13 degrees at its maximum. This is because when the inclination angle $\beta_1$, exceeds the above values, the inclination angle at the acute angle side corner 30a of the block side wall 40a becomes too great, so that the slope exerts a harmful influence upon the grip force on a road and the tire drainage.

Further, the inclination angle $\beta_3$ at the obtuse angle corners 30b of the block side wall 40b formed along the main groove $10_1$ is 8 degrees at its minimum; while that $\beta_3$ at the obtuse angle corners 30b of the block side wall 40b formed along the main groove $10_2$ is 7 degrees at its minimum. This is because when the inclination angle $\beta_3$ is less than the above values, the slope at the obtuse angle corners 30b of the block side wall 40b becomes too small, so that the desired effect of the present invention will not be expected.

Test Examples

To confirm the effect of the present invention, tests have been made for measurements of pattern noise and unbalanced abrasion. The specifications of the tires used for the tests are as follows:
(A) Tires of the present invention
 * Tire size . . . 205/60R15
 * Tread pattern . . . As shown in FIG. 2
 * Width of the main groove $10_1$ . . . 10 mm
 * Width of the main groove $10_2$ . . . 6 mm
 * Width of the main groove $10_3$ . . . 2 mm
 * Inclination angle $\beta_1$ at acute angle corners 30a of the block side wall 40a along the main groove $10_1$, in blocks $30_1$ formed between two main grooves $10_1$ and $10_2$ and two transversal grooves 20 . . . 25 degrees
 * Inclination angle $\beta_1$ at acute angle corners 30a of the block side wall 40a along the main groove $10_2$ . . . 13 degrees
 * Inclination angle $\beta_3$ at obtuse angle corners 30b of the block side walls 40b along the main groove $10_1$ . . . 8 degrees

* Inclination angle $\beta_3$ at the obtuse angle corners 30b of the block side walls 40b along the main groove $10_2$ ... 7 degrees (B) Tires for comparison
* Tire size, tire pattern, width of each of grooves $10_1$, $10_2$ and $10_3$ are all the same as those of the present invention.
* $\beta_1$ at 30a of 40a along $10_1$ in $30_1$ ... 12 degrees
* $\beta_1$ at 30a of 40a along $10_2$ ... 10 degrees
* $\beta_3$ at 30b of 40b along $10_1$ ... 12 degrees
* $\beta_3$ at 30b of 40b along $10_2$ ... 10 degrees (Measurement Method)
* The pattern noise was measured by use of an ordinary noise meter.
* The unbalanced abrasion was measured by checking a difference in height between the block $30_1$ and the adjacent block on the tie tread surface, after a vehicle provided with test tires had traveled at a predetermined distance.

(Measured Results)

Table below lists the measured results. The numerals indicate indices when the comparison tire is determined as 100. Therefore, the smaller the index is, the more preferable will be the unbalanced abrasion.

|  | Comparison | Invention |
|---|---|---|
| Noise | 100 | 100 |
| Abrasion | 100 | 78 |

The table indicates that in the radial tire according to the present invention, the unbalanced abrasion can be reduced markedly without increasing pattern noise.

What is claimed is:

1. A pneumatic radial tire having a tread portion comprising; blocks having sidewalls with a slope and arranged on a tread surface thereof and partitioned by a pair of first relatively wide main circumferential grooves ($10_1$) formed at a tread crown portion thereof, at least a pair of second relatively narrow main circumferential grooves ($10_2$) extending in parallel to and axially outside the first main circumferential grooves, and transverse grooves intersecting the first and second main circumferential grooves being inclined at an angle thereto, wherein difference in inclination angle between the block sidewall slope and a line perpendicular to the tread surface, of block sidewalls (40) between acute angle corners (30a) and obtuse angle corners (30b) on the first main circumferential groove ($10_1$) side is greater than that of block sidewalls on the second main circumferential groove ($10_2$) side, and wherein said inclination angle increases gradually from the obtuse angle corner to an acute angle corner.

2. The pneumatic radial tire as set forth in claim 1, wherein a difference in the angle between the normal line on the tread surface and the block side wall is 5 degrees or more between the obtuse angle corner and the acute angle corner of the block.

3. The pneumatic radial tire as set forth in claim 1, wherein the block side walls are sloped down to a bottom of a first relatively wide main circumferential groove formed on a tire equatorial surface side.

4. The pneumatic radial tire as set forth is claim 3, wherein the block side walls are sloped down to a bottom of a second main circumferential groove formed adjacent to the first relatively wide main circumferential groove.

5. The pneumatic radial tire as set forth in claim 3, wherein the angle between the normal line and the block side wall is 8 degrees or more at the obtuse angle corner and 25 degrees or less at the acute angle corner on the first wide main circumferential groove side.

6. The pneumatic radial tire as set forth in claim 4, wherein the angle between the normal line and the block side wall is 7 degrees or more at the obtuse angle corner and 13 degrees or less at the acute angle corner on the second main circumferential groove side.

7. The pneumatic radial tire as set forth in claim 1, wherein block side walls extending along the transversal grooves are additionally sloped down to bottoms of the transversal grooves in such a way that an angle between a normal line on the tread surface and the block side wall increases gradually from near an obtuse angle corner of the block to near an acute angle corner thereof.

8. A pneumatic radial tire having a tread pattern comprising; blocks having sidewalls with a slope and arranged on a tread surface thereof and partitioned by a pair of first relatively wide main circumferential grooves ($10_1$) formed at a tread crown portion thereof, at least a pair of second relatively narrow main circumferential grooves ($10_2$) extending in parallel to an axially outside the first main circumferential grooves, and transverse grooves intersecting the first and second main circumferential grooves being inclined at an angle thereto, wherein said blocks are formed into different shapes such that difference in angle, measured between adjacent block sidewall surfaces to define corners, between acute angle corners and obtuse angle corners is different on the tread surface; and a different ($\beta_1-\beta_3$) in inclination angle measured between the block sidewall slope and a line perpendicular to the tread surface, between the acute angle corners (30a) and the obtuse angle corners (30b) is increased in proportion to the difference in angle between the acute angle corner and the obtuse angle corner, said inclination angle gradually increasing from the obtuse angle corner to an acute angle corner.

9. A pneumatic radial tire having a tread pattern comprising; blocks having sidewalls with a slope and arranged on a tread surface thereof and partitioned by a pair of first relatively wide main circumferential grooves ($10_1$) formed at a tread crown portion thereof, at least a pair of second relatively narrow main circumferential grooves ($10_2$) extending in parallel to and axially outside the first main circumferential grooves, and transverse grooves intersecting the first and second main circumferential grooves being inclined at an angle thereto, wherein block sidewalls extending along at least one circumferential side of said blocks are sloped outwardly down in such a way that a width at a bottom of a main circumferential groove is inversely proportional to an inclination angle ($\beta$) of said block sidewalls, as measured between the block sidewall slope and a line perpendicular to the tread surface, said inclination angle changing on said block sidewall along said circumferential side, and a width of a top of the groove is uniform along the circumferential direction of the tire.

* * * * *